US006218463B1

(12) United States Patent
Molock et al.

(10) Patent No.: US 6,218,463 B1
(45) Date of Patent: *Apr. 17, 2001

(54) OCULAR DEVICES MANUFACTURED WITH FREE RADICAL-POLYMERIZABLE LATENT ULTRA-VIOLET ABSORBERS

(75) Inventors: Frank F. Molock, Orange Park, FL (US); Ivan M. Nunez, Roankoke, VA (US); Laura Elliott, Austin, TX (US)

(73) Assignee: Johnson & Johnson Vision Care, Inc., Jacksonville, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/063,625

(22) Filed: Apr. 20, 1998

(51) Int. Cl.⁷ ............................... C08K 5/34; C08K 5/13
(52) U.S. Cl. .................... 524/720; 524/740; 523/106; 523/108; 252/403; 252/407
(58) Field of Search .................. 523/106, 108; 524/720, 740; 252/403, 407

(56) References Cited

U.S. PATENT DOCUMENTS

| 3,313,866 | 4/1967 | Horton et al. | 260/880 |
|---|---|---|---|
| 3,365,421 | 1/1968 | Horton et al. | 260/47 |
| 3,391,110 | 7/1968 | Coleman | 260/47 |
| 4,304,895 | 12/1981 | Loshaek | 526/313 |
| 4,390,676 | 6/1983 | Loshaek | 526/313 |
| 4,528,311 | 7/1985 | Beard et al. | 524/91 |
| 4,555,559 | 11/1985 | Kimura et al. | 528/16 |
| 4,719,248 | 1/1988 | Bambury et al. | 523/108 |
| 4,868,251 | 9/1989 | Reich et al. | 525/479 |
| 4,929,250 | 5/1990 | Hung et al. | 8/507 |
| 4,963,160 | 10/1990 | Hung et al. | 8/507 |
| 5,030,731 | * 7/1991 | Slongo et al. | 548/260 |
| 5,098,445 | 3/1992 | Hung et al. | 8/507 |
| 5,133,745 | 7/1992 | Falcetta et al. | 623/6 |
| 5,135,965 | 8/1992 | Tahan . | |
| 5,141,990 | 8/1992 | McKoy et al. . | |
| 5,597,854 | * 1/1997 | Birbaum et al. | 524/100 |
| 5,663,212 | 9/1997 | Wakata et al. . | |

FOREIGN PATENT DOCUMENTS 0 168 773  1/1986  (EP) .
0 188 110  7/1986  (EP) .

* cited by examiner

Primary Examiner—Kriellion Sanders

(57) ABSTRACT

The invention provides compositions for forming ocular devices which compositions contain latent UV absorbers. The compositions of the invention may be used to conveniently and efficiently produce ocular devices through UV initiated, free radical polymerization.

20 Claims, No Drawings

OCULAR DEVICES MANUFACTURED WITH FREE RADICAL-POLYMERIZABLE LATENT ULTRA-VIOLET ABSORBERS

FIELD OF INVENTION

The invention relates to ocular devices containing ultra-violet absorbers. In particular, the invention relates to compositions for producing ocular devices that contain ultra-violet absorbers. The compositions of the invention can be used to conveniently and efficiently produce ocular devices through UV initiated, free radical polymerization processes.

BACKGROUND OF THE INVENTION

It is well known that ultra-violet ("UV") radiation in the 210 to 315 nanometer range may cause corneal damage. Thus, ocular devices containing UV absorbers are desirable and methods for their production are known.

Most known UV absorbers used in ocular devices are incorporated into the polymer matrix forming the device by copolymerization of the monomers forming the device with a functionalized form of UV absorber. The majority of commercially available ocular devices, particularly contact lenses, are manufactured using free radical-polymerization processes. The most convenient method of carrying out these polymerizations is by irradiation with UV light.

Unfortunately, when UV light irradiation is used in the presence of the UV absorber, the UV absorbing functional group or groups of the absorber interferes with curing in that the functional group competes with the UV photoinitiator used in the polymerization for the incident light. The result is that the polymerization process is less efficient and may produce undercured products. Although changes in the polymerization process, such as the use of visible light initiators, may be made, these changes generally make the polymerization less efficient.

Thus, a need exists for a method for providing an efficient process for producing ocular devices containing UV absorbers using a UV initiated polymerization processes.

DETAILED DESCRIPTION OF THE INVENTION AND THE PREFERRED EMBODIMENTS

The invention provides latent UV absorbers, or absorbers for use in UV initiated polymerization processes that do not interfere with the photoinitiation of the polymerization, and methods for their production. Further, the invention provides an efficient and convenient method for producing ocular devices containing UV absorbers via UV initiated, free radical polymerization.

In one embodiment, the invention comprises, consists essentially of, and consists of a composition comprising at least one ocular device-forming monomer and an absorbent effective amount of a latent UV absorber. In another embodiment, the invention provides a method for producing UV absorber containing ocular devices comprising, consisting essentially of, and consisting of the steps of mixing an absorbent effective amount of a latent UV absorber and at least one ocular device-forming monomer to form a mixture, curing the mixture, and regenerating the latent UV absorber.

In still another embodiment, the invention provides a latent UV absorber comprising, consisting essentially of, and consisting of a UV absorber having at least one functional group that reacts with UV light, which functional group is protected. By "protected" is meant that the functional group is reversibly altered so that it cannot react with UV light. In yet another embodiment, the invention provides a method for preparing the latent UV absorber comprising, consisting essentially of, and consisting of the steps of reacting a UV absorber having at least one UV reacting functional group with a protecting agent.

By "UV absorber" is meant a compound or composition capable of absorbing or screening out UV radiation. By "protecting agent" is meant any compound or composition that reacts with the UV absorber so as to render the UV functional group or groups of the absorber substantially unreactive to UV light, but that permits UV initiated, free radical polymerization of the UV absorber and an ocular device-forming monomer to proceed. Thus, a "latent UV absorber" is a UV absorber the UV reacting functional group or groups of which are protected so that reaction with UV light does not take place or takes place only to a minimal extent, yet which absorber can undergo UV initiated polymerization with an ocular device-forming monomer.

It is a discovery of the invention that free radical, UV light initiated polymerization of ocular device-forming monomers and a UV absorber may take place efficiently by rendering the absorber latent through the use of a protecting agent. Suitable UV absorbers are those that may be polymerized with the monomeric materials used to form ocular devices, are known in the art, and are commercially available or methods for their making known. Generally, useful absorbers include, without limitation, benzophenones, benzotriazoles, triazines, substituted acrylonitriles, salicylic acid derivatives, benzoic acid derivatives, nickel complexes, cinnamic acid derivatives, chalcone derivatives, dypnone derivatives, crotonic acid derivatives and the like, and mixtures thereof.

Examples of benzophenones include, without limitation, 2-hydroxy benzophenones such as 2-hydroxy-4-acryloxy alkoxy benzophenones, 2-hydroxy-4-methacryloxy alkoxy benzophenones, allyl-2-hydroxybenzophenone, 2,4-dihydroxy benzophenone, 2-hydroxy-4-methacryloxy benzophenone, as well as 4-hydroxy, 4-methoxy, 4-octoxy, 4-decloxy, 4-dodecyloxy, 4-benzyloxy, 4,2',2'-trihydroxy and 2'-hydroxy-4,4'-dimethoxy derivatives, and the like, and mixtures thereof.

Examples of benzotriazoles include, without limitation, 2-(2'-hydroxyphenyl)benzotriazoles such as 2-(2'-hydroxyphenyl)-2H-benzotriazole and 5'-methyl, 3'5'-di-tert-butyl, 5'-(1,1,3,3-tetramethylbutyl), 5-chloro-3',5'-di-tert-butyl, 5-chloro-3'-tertbutyl-5'-methyl, 3'-secbutyl-5'-tertbutyl, 4'-octoxy, 3'5'-di-tert-amyl, 3',5'-bis($\alpha,\alpha$-dimethylbenzyl) derivatives, 2-(2-hydroxy)-2H-benzotraizole, 2-(2-hydroxy-5-vinylphenyl)-2H-benzotriazole 2-(2-hydroxy-5-acrylyloxyphenyl)-2H-benzotriazole, 2-(2-hydroxy-3-methacrylamido methyl-5-tert octylphenyl)benzotriazole, and the like, and mixtures thereof Additional absorbers useful in the invention are disclosed in U.S. Pat. Nos. 5,133,745, 5,098,445, 4,929,250, 4,963,160, 4,868,251, 4,304,895, 4,390,676, 3,391,110, 3,365,421, 3,313,866, and 3,162,676. Preferred absorbers are benzotriazoles and benzophenones.

Useful protecting agents, reactions of these agents with the UV absorber to render the absorber latent, and reaction conditions will be readily apparent to those ordinarily skilled in the art depending on the absorber selected. Generally, the protecting agent selected is one that will not participate in the polymerization of the absorber and ocular device-forming monomer other than via the polymerizable group, will function as an atom source during the free radical polymerization process, and will act to quench the absorbers excited states.

For example, benzophenone absorbers may be reacted with a compound or composition, such as trimethyl orthoformate, in order to unconjugate the phenyl groups so that they do not interfere with photopolymerization of the absorber and an ocular device-forming monomer. As another illustrative alternative, the C=O group of certain of the absorbers may be reduced to the corresponding alcohol by a reducing agent, such as aluminum triisopropoxide. As yet another alternative, the ketals may be formed from absorbers containing ketone carbonyls.

The UV absorber may be mixed and polymerized with at least one ocular device-forming monomer. Such monomers are well known in the art and include, without limitation, silicon containing monomers, hydroxy alkyl esters of polymerizable unsaturated acids, such as acrylic, methacrylic, fumaric, and maleic acids, alkyl and cycloalkyl acrylates and methacrylates, noncyclic amides, heterocyclic N-vinyl lactams, aminoalkyl esters of unsaturated acids, mercapto alkyl esters of unsaturated acids, styryl monomers, and the like. Preferred monomers include methyl methacrylate, hydroxyethyl methacrylate, ethyleneglycol dimethacrylate, ethyl acrylate, butyl acrylate, styryl monomers, N-vinyl pyrrolidone, and mixtures thereof. More preferred monomers are hydroxyethyl methacrylate, ethyleneglycol dimethacrylate, methyl methacrylate and mixtures thereof.

Generally the latent UV absorber is present in an absorbent effective amount, which is an amount sufficient to absorb, once the latent absorber is regenerated, a substantial portion, at least about 80 percent, of the UV light in the range of from about 280 to about 370 nm that impinges on the ocular device formed. One ordinarily skilled in the art will recognize that the specific amount of absorber used will depend on the molecular weight of the absorber and its extinction coefficient in the about 280 to about 370 nm range. Typically, about 0.5 percent to about 5.0 percent, preferably about 0.5 percent to about 3.0 percent, by weight of the monomer mixture is used.

Although polymerization may be carried out by any known method, the invention will most beneficially be used in UV initiated, free radical polymerizations. These processes and conditions for carrying them out are well known to those ordinarily skilled in the art.

Typically, the UV polymerization is carried out in the presence of a photoinitiator which photoinitiators are well known and commercially available. Illustrative UV initiators include, without limitation, 2-hydroxy-2-methyl propiophenone, (1-hydroxycyclohexyl)phenyl ketone, and 2,2-dimethoxy-2-phenyl acetophenone, DAROCURE™ 1173, IRGACURE™ 184, and IRGACURE™ 651, respectively all available from CIBA-Geigy.

In addition to a photoinitiator, it may be desirable to include other additives to the mixture top be cured. Suitable additives include, without limitation, dyes, stabilizers, diluents, surfactants, crosslinkers, and the like.

Preferably, the mixture of latent absorber, monomer, and other additives is formed and cured so as to form a contact lens. Methods for forming contact lenses are well known and include, without limitation, spin casting, mold casting, and the like.

After curing is completed to the desirable degree, the latent absorber undergoes regeneration or restoration of its UV functional groups. The conditions for regeneration will depend on the protecting agent and absorber used. For example, in cases in which a reducing agent is used to convert the C=O groups of a benzophenone to C—OH groups, regeneration may be carried out by contacting the cured compound with a slightly alkaline, 1 percent potassium permanganate solution, or another mild oxidizing agent, for several minutes. As another example, air may be used to regenerate the UV functional groups in some cases.

The invention may be most useful for forming ocular devices, such as spectacle lenses, contact lenses, intraocular lenses, and the like. However, it will be recognized that the invention is suitable for application to other polymeric substrates in which UV absorbing characteristics are desirable, such as films, solar energy collectors, polymeric coatings and films, fluorescent light diffusers, packaging materials, vinyl window coverings, automobile paints, fiberglass constructions, and the like.

The invention will be clarified further by a consideration of the following non-limiting examples.

EXAMPLES

Example 1

75 g of 3,3,4,4-benzophenone tetracarboxylic dianhydride (0.343 moles) were dissolved in 225 mL anhydrous pyridine, the pyridine (less than 0.05% water). The mixture was added to a 1 L jacketed, three-necked, round bottomed flask equipped with a drying tube filled with CaSO, a magnetic stirring bar, and a 250 mL addition funnel. The circulating fluid was set at 20° C. and a solution of 60.2 g 2-hydroxyethyl methacrylate ("HEMA") (0.463 moles), 3.45 g 4-pyrrolidino pyridine (23.7 moles), and 65 g anhydrous pyridine were added dropwise with rapid stirring to the contents of the round bottomed flask. The addition took place over a 3 hr period. The round bottomed flask contents were allowed to stir at 20° C. for an additional 16 hrs. At that point, the anhydride groups were found to be completely reacted as indicated by the absence of the anhydride carbonyl absorption band from the IR spectra of the crude mixture.

The crude reaction mixture was transferred to a 2 L jacketed, three necked, round bottomed flask equipped with a mechanical stirrer, a drying tube filled with $CaSO_4$, and a stopper on the third neck. 96.1 g 1,3-dicyclohexyl dicarbodiimide (0.466 moles) were added directly to the contents of the round bottomed flask via a powder funnel and dissolved by stirring at 20° C. for 1.5 hrs. The circulating fluid temperature was then lowered to 0° C. and 22.7 g dry ethanol (less than 0.063% water) (0.493 moles) were added dropwise over a period of 1 hr via a 60 mL addition funnel. After the addition was completed, the funnel was rinsed with approximately 20 mL pyridine and the circulating fluid temperature was set at 20° C. at which point the crude reaction mixture became deep red. The reaction proceeded for another 16 hrs after which the pyridine was removed under reduced pressure in a rotary evaporator to yield 156.6 g crude product. The crude product was dissolved in 225 g ethyl acetate and washed twice with equal volumes of 5% aqueous HCl (resulting in an emulsion that was broken up with NaCl) and, subsequently, with equal volumes of deionized water. The organic layer was dried over anhydrous $MgSO_4$, filtered and the solvent removed under reduced pressure in a rotary evaporator to yield 110.9 g viscous, clear-orange oil.

59.1 g (0.086 mol (est.)) of the product was then poured into a 2 L round bottomed flask equipped with a magnetic stirring bar. 350 g anhydrous acetonitrile (less than 0.005 percent water) were added to the flask and allowed to dissolve the product. 120 g montmorillonite K-10 clay were charged to the flask via a powder funnel and, subsequently, 180 mL trimethyl orthoformate were poured into the flask. The resulting slurry was allowed to stir at room temperature under a dry nitrogen atmosphere for 48 hrs. The solvent was then removed under pressure in a rotary evaporator to yield 26 g (44% yield) of a clear, viscous oil.

Example 2

228 g dry 2-propanol (less than 0.005% water), 75 g toluene (less than 0.005% water), and 25 g 4-methacryloxy-2-hydroxybenzophenone (88.7 mmol) were charged into a 500 mL, three necked, jacketed, round bottomed flask equipped with a Friedrich condenser capped with a drying tube filled with indicating CaSO, a thermometer, a magnetic stirrer, and a glass stopper. The temperature of the circulating fluid to the condenser was set a 5° C. The contents of the flask were allowed to stir for a few minutes and 18 g aluminum triisopropoxide (88.2 mmol) were added to the reaction flask via a powder funnel. Residue of the aluminum isopropoxide on the funnel was washed into the flask with 38 g dry 2-propanol. The circulating fluid to the reaction was set at 65° C. The reaction was then followed by the appearance of a very intense OH band in the IR spectra centered at 3350 $cm^{-1}$ as well as disappearance of UV absorption above 250 nm.

The reaction was deemed complete after 24 hrs at which point the reaction mixture was allowed to cool to room temperature and the solvent was removed. To the resulting yellow oil was added 200 mL 2.5 M HCl (aq.) and the resulting mixture was stirred in a rotary evaporator for 1 hr at ambient temperature and pressure. The insoluble, yellow solid that resulted was re-dissolved in toluene and mixed with leftover liquid material. The toluene solution was washed with deionized water, dried over $MgSO_4$, filtered, and the solvent removed under reduced pressure. The viscous, yellow oil (12.9 g, 51% yield based on starting 4-methacryloxy-2-hydroxybenzophenone) exhibited IR and UV spectra consistent with the loss of the benzophenone functional group.

Examples 1 and 2 illustrate alternative methods for producing a latent UV absorber using a benzophenone absorber.

Example 3

A reactive monomer mixture of 0.8 wt percent ethylene glycol dimethacrylate, 0.4 wt percent DAROCUR™ 1173, 2 wt percent methacrylic acid, and 96.8 wt percent HEMA were blended with enough diluent to make up a 48 percent monomer/52 percent diluent mix. The diluent was a 50:50 by wt mixture of PHOTONOL™ 7025 ( an 8 mole ethoxylate of bisphenol A) and GLUCAMTM E-20 (a 20 mole ethoxylate of methyl glucose). This mixture constituted the control, or zero UV blocker concentration sample.

After thoroughly mixing the above blend at 65° C., the mixture was allowed to stir under reduced pressure, 40 mm HG, for 30 min at 65° C. and then transferred to two-piece, polystyrene, contact lens molds. The filled molds were exposed to 300–380 nm UV light (1.5–2.0 Joules/$cm^2$ dose) for 30 min. at room temperature. The molds were then separated and placed in physiological saline solution for 3 hrs at 70° C. to remove the inert diluent and any residual, unreacted monomer. After the initial leaching period, the lenses were allowed to equilibrate to room temperature in a fresh bath of physiological saline.

Example 4

A reactive monomer mixture was prepared as in Example 3, except that 1 wt percent of the reduced 4-hydroxy benzophenone of Example 2 and 95.8 wt percent of HEMA were used. The mixture was blended, molded, and cured as in Example 3.

Example 5

A reactive monomer mixture was prepared as in Example 3, except that 5 wt percent of the reduced 4-hydroxy benzophenone Example 2 and 91.8 wt percent of HEMA were used. The mixture was blended, molded, and cured as in Example 3.

Example 6

The lenses prepared in Examples 4 and 5 were exposed to a slightly alkaline (pH 8.0, borate buffer) 1% potassium permanganate solution. Testing for regeneration was carried out by running a spectrum from 200 nm to 500 nm and comparing the UV absorbance compared to lenses without UV absorbers. The results showed that good absorbance of the lenses of Examples 4 and 5 and, thus, that, as a result of exposure to the solution, the benzophenone group was regenerated.

What is claimed is:

1. A compositing comprising at least one ocular device-forming monomer and an absorbent effective amount of a latent UV absorber comprising at least one functional group that reacts with light and wherein the at least one functional group is protected, wherein the composition is capable of undergoing UV initiated polymerization.

2. The composition of claim 1 wherein the ocular device forming-monomer is selected from the group consisting of methyl methacrylate, hydroxyethyl methacrylate, ethyleneglycol dimethacrylate, ethyl acrylate, butyl acrylate, styl monomers, N-vinyl pyrrolidone, and mixtures thereof.

3. The composition of claim 1 wherein the ocular device-forming monomer is hydroxyethyl methacrylate.

4. The composition of claim 1 wherein the ocular device-forming monomer is ethyleneglycol dimethacrylate.

5. The composition of claim 1 wherein the ocular device-forming monomer is methyl methacrylate.

6. The composition of claim 1 wherein the absorber is selected from the group consisting of benzophenones, benzotriazoles, triazines, substituted acrylonitriles, salicylic acid derivatives, benzoic acid derivatives, nickel complexes, cinnamic acid derivatives, chalcone derivatives, dypnone derivatives, crotonic acid derivatives and mixtures thereof.

7. The composition of claim 1 wherein the absorber is a 2-hydroxy benzophenone.

8. The composition of claim 1 wherein the absorber is a benzotriazole.

9. A composition comprising at least one ocular device-forming monomer selected from the group consisting of methyl methacrylate, hydroxyethyl methacrylate, ethyleneglycol dimethacrylate, ethyl acrylate, butyl acrylate, styryl monomers, N-vinyl pyrrolidone, and mixtures thereof and a latent UV absorber comprising at least one functional group that reacts with light and wherein the at least one functional group is protected, wherein the UV absorber is selected from the group consisting of benzophenones and benzotriazoles, wherein the absorber is present in an amount of from about 0.5 to about 5.0 percent by weight of the monomer mixture and wherein the composition is capable of undergoing UV initiated polymerization.

10. The composition of claim 9 wherein the absorber is a 2-hydroxy benzophenone.

11. A method for forming a UV absorber containing ocular device comprising the steps of:

mixing a latent UV absorber comprising at least one functional group that reacts with light and wherein the at least one functional group is protected and at least one ocular device forming-monomer;

polymerizing the mixture by UV initiated polymerization; and regenerating the latent UV absorber in the polymerized mixture to produce a UV absorber containing ocular device.

12. The method of claim 11 wherein the ocular device-forming monomer is selected from the group consisting of methyl methacrylate, hydroxyethyl methacrylate, ethyleneglycol dimethacrylate, ethyl acrylate, butyl acrylate, styryl monomers, N-vinyl pyrrolidone, and mixtures thereof the latent UV absorber is selected from the group consisting of benzophenones and benzotriazoles, and wherein the absorber is present in an amount of from about 0.5 to about 5.0 percent by weight of the monomer mixture.

13. The method of claim 11 wherein the UV absorber containing ocular device is a contact lens.

14. The method of claim 12 wherein the UV absorber containing ocular device is a contact lens.

15. The method of claim 12 wherein the UV absorber is a 2-hydroxy benzophenone.

16. A latent UV absorber for use in UV initiated polymerization reactions, comprising a UV absorber having at least one functional group reactive with UV light wherein the at least one functional group is protected.

17. The absorber of claim 16 wherein the UV absorber is selected from the group consisting of benzophenones, benzotriazoles, triazines, substituted acrylonitriles, salicylic acid derivatives, benzoic acid derivatives, nickel complexes, cinnamic acid derivatives, chalcone derivatives, dypnone derivatives, crotonic acid derivatives and mixtures thereof.

18. The absorber of claim 16 wherein the absorber is a 2-hydroxy benzophenone.

19. A method for preparing the latent UV absorber of claim 16 comprising the steps of reacting a UV absorber having at least one functional group reactive with UV light with a protecting agent.

20. The method of claim 19 wherein the UV absorber is selected from the group consisting of benzophenones, benzotriazoles, triazines, substituted acrylonitriles, salicylic acid derivatives, benzoic acid derivatives, nickel complexes, cinnamic acid derivatives, chalcone derivatives, dypnone derivatives, crotonic acid derivatives and mixtures thereof.

* * * * *